United States Patent [19]

Suzuki et al.

[11] Patent Number: 5,037,353

[45] Date of Patent: Aug. 6, 1991

[54] HYDRAULIC POWER TRANSMISSION JOINT WHICH IS USED IN VEHICLES

[75] Inventors: Satoru Suzuki; Hideaki Ina, both of Kosai, Japan

[73] Assignee: Fuji Tekko Co., Ltd., Shizuoka, Japan

[21] Appl. No.: 461,124

[22] Filed: Jan. 4, 1990

[30] Foreign Application Priority Data

Jan. 17, 1989 [JP] Japan ................................. 1-7967
Apr. 14, 1989 [JP] Japan ................................. 1-94722
Jul. 6, 1989 [JP] Japan ................................. 1-175047

[51] Int. Cl.$^5$ ........................................... F16D 31/02
[52] U.S. Cl. .................................................. 464/027
[58] Field of Search ..................... 464/2, 24, 27, 160; 192/54, 85 A

[56] References Cited

U.S. PATENT DOCUMENTS

| | | | |
|---|---|---|---|
| 2,511,518 | 6/1950 | Stephens | 192/103 FA |
| 3,393,583 | 7/1968 | Mueller | 475/160 X |
| 3,488,980 | 1/1970 | Burrough | 464/27 X |
| 4,770,651 | 9/1988 | Friedrich | 464/27 |

Primary Examiner—Daniel P. Stodola
Assistant Examiner—William G. Battista
Attorney, Agent, or Firm—Wenderoth, Lind & Ponack

[57] ABSTRACT

Two rotary shafts for transmitting power are coupled so as to be relatively rotatable. When a rotational speed difference occurs between the two shafts, a torque corresponding to the rotational speed difference is hydraulically generated and is transmitted from the shaft of the higher rotational speed to the shaft of the lower rotational speed. A cam surface having two or more cam mountains is formed on the inside edge surface of the cam housing. A rotor is assembled in the cam housing so as to be relatively rotatable. The rotor faces the cam surface and is formed with a plurality of plunger chambers in the axial direction. Plungers are movably assembled in the plunger chamber through return springs. The plunger chambers are connected to the high pressure chamber through delivery passages having delivery valves. The plunger chambers are communicated with the low pressure chamber through suction passages having suction valves and oil circulating grooves formed in the axial direction of the rotor outer peripheral surface. A throttle mechanism operated by an increase in oil temperature and in pressure in the high pressure chamber is arranged between the high and low pressure chambers. A variable orifice mechanism whose orifice cross sectional area changes with an increase in delivery pressure may also be provided in place of the throttle mechanism.

8 Claims, 20 Drawing Sheets

Y AXIS No.1 STROKE (mm)
X AXIS ROTATIONAL ANGLE (°)

Y AXIS WHOLE STROKE (mm)
X AXIS ROTATIONAL ANGLE (°)

Y AXIS FLUCTUATION IN VOLUME (mm)
X AXIS ROTATIONAL ANGLE (°)

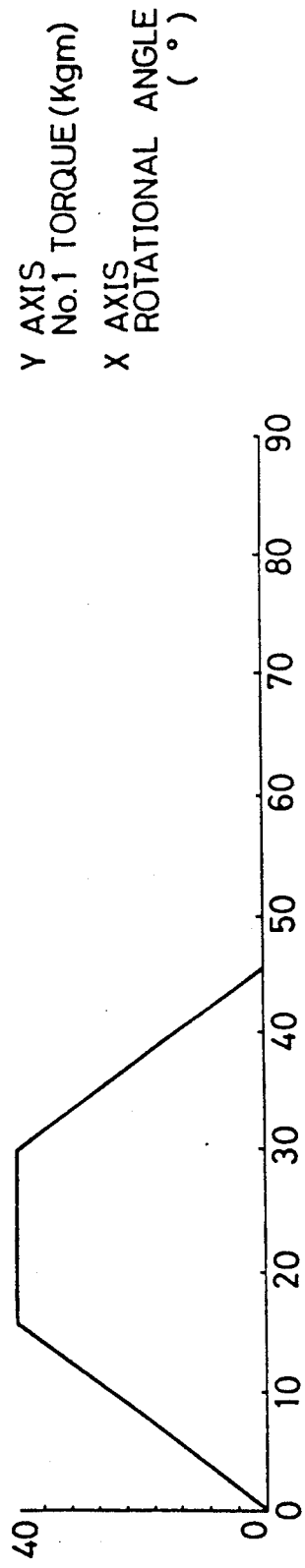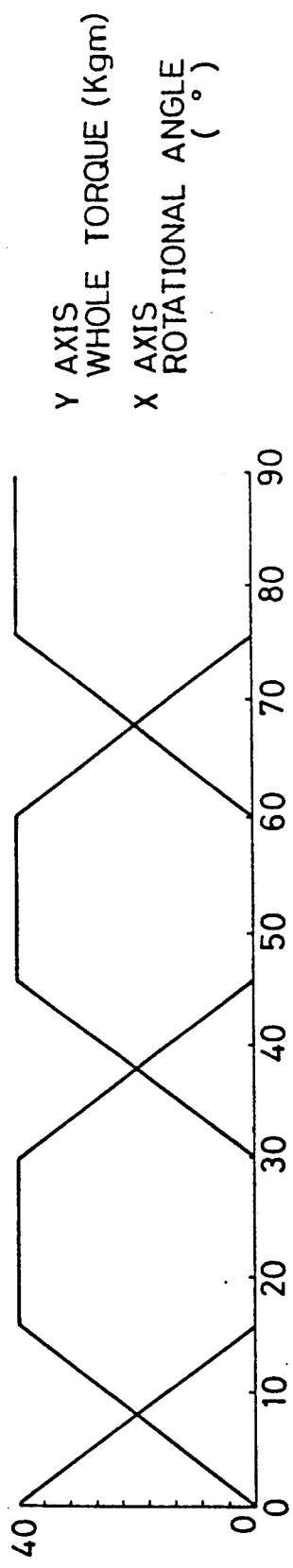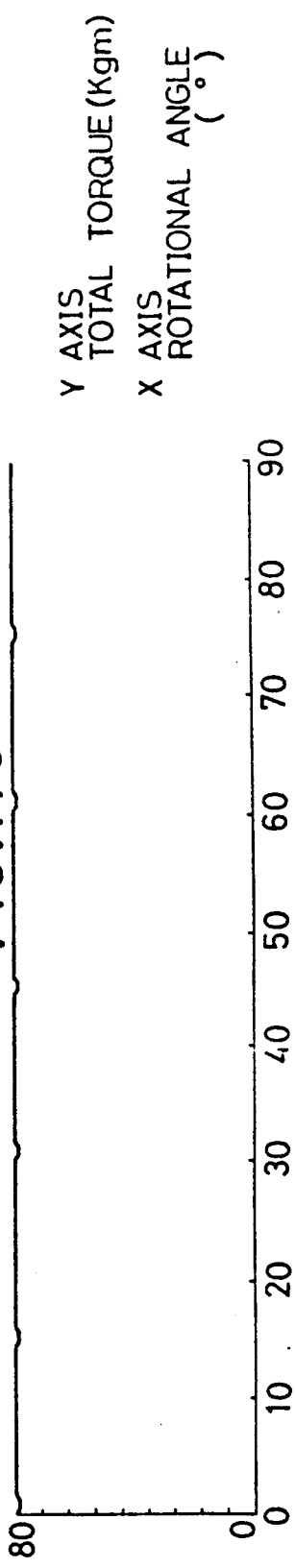

FIG.12
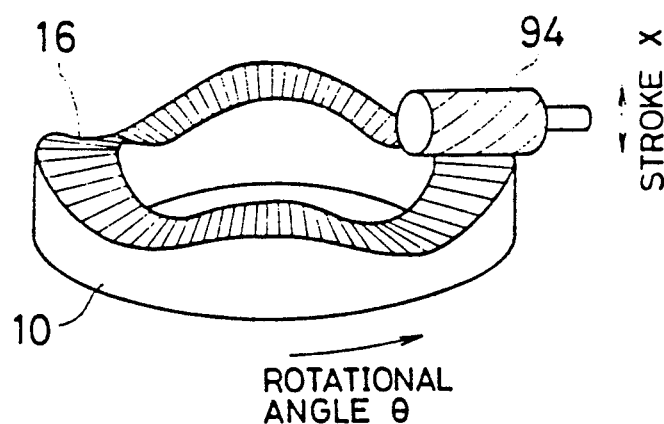
FIG.13
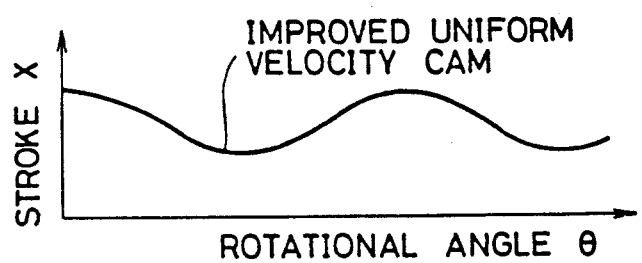
FIG.14  FIG.15  FIG.16
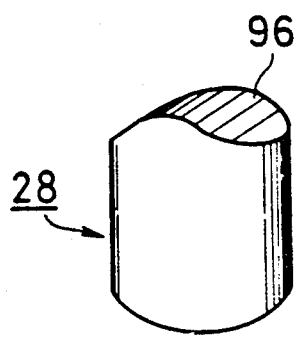
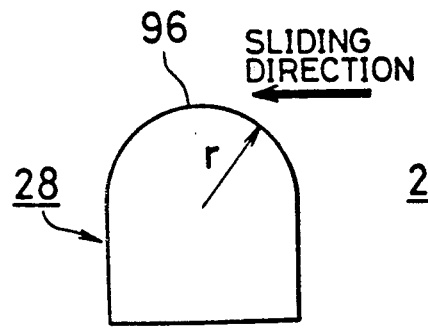
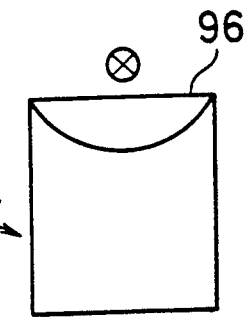

HYDRAULIC POWER TRANSMISSION JOINT WHICH IS USED IN VEHICLES

BACKGROUND OF THE INVENTION

The present invention relates to a hydraulic power transmission joint which is used to distribute a driving force of a vehicle and, more particularly, to a hydraulic power transmission joint in which two power rotary shafts are coupled so as to be relatively rotatable and the torque corresponding to the rotational difference is transmitted.

Hitherto, a hydraulic power transmission joint is used to distribute the power to the front and rear wheels in a four-wheel drive vehicle or to distribute the power to the right and left drive wheels.

As such a hydraulic power transmission joint, for instance, there has been known a joint using a plunger pump mechanism as shown in U.S. Pat. No. 3,393,583 or 2,511,518.

However, in such conventional hydraulic power transmission joints, when a hydraulic pressure is generated by a stroke of a plunger in association with the relative rotation between a cam housing and a rotor, and the torque is transmitted, the heat generated is collected in the chamber in the rotor and the cooling efficiency is bad.

Therefore, even if the temperature of the oil suddenly rises upon transmission of the torque and the relative rotation is stopped and the torque transmission is stopped, the temperature of fluid does not so soon decrease. Thus, there are problems such that the oil deteriorates, quickly air suction occurs due to a volume phenomenon of the oil, and an abnormal abrasion of the cam and plunger occurs due to the deterioration in lubricating performance. On the other hand, there are also problems in that an oil leakage occurs due to the deterioration in the oil seal of each section, the normal operation cannot be executed, and the cam and plunger are burnt.

Further, since the plunger is reciprocated in the axial direction, there is a problem in that when a defective return or the like of the plunger occurs, an imbalance of the weight occurs, and vibrations result.

Moreover, since there is used a structure wherein the hydraulic chamber is shut in by assembling the plunger, there are problems in that no oil cannot be sealed into the hydraulic chamber after completion of the assembly, the assembling works must be executed while dipping the parts into the oil, the air bleed cannot be sufficiently executed, and the assembling costs are high.

SUMMARY OF THE INVENTION

It is an object of the invention to provide a hydraulic power transmission joint with a structure such that a cam housing and a rotor are arranged so as to be relatively rotatable and a plunger assembled in the rotor is reciprocated in the axial direction by the relative rotation of the cam housing and the rotor.

Another object of the invention is to provide a hydraulic power transmission joint in which the cooling performance of the oil is raised to thereby prevent damage to the seal and oil leakage.

Still another object of the invention is to provide a hydraulic power transmission joint in which oil which was drained by the stroke of a plunger is circulated between the outer periphery of a rotor and a cam housing, thereby raising the cooling efficiency.

Still another object of the invention is to provide a hydraulic power transmission joint having transmission torque characteristics which can satisfy required performances, which are different depending on the use location of a joint and the characteristics of a vehicle.

Still another object of the invention is to provide a hydraulic power transmission joint which can realize desired transmission torque characteristics by a variable orifice mechanism whose orifice cross sectional area changes in accordance with a delivery pressure from a plunger.

That is, a hydraulic power transmission joint of the invention couples two power transmission shafts so as to be relatively rotatable, and when a speed difference due to the relative rotation occurs between the two shafts, the torque according to the speed difference is transmitted from the shaft of a higher rotational speed to the shaft of a lower rotational speed.

A fundamental structure of a joint of the invention comprises a cam housing in which a cam surface having two or more cam mountains is formed on its inside edge surface. A rotor in which a plurality of plunger chambers are formed in the axial direction face the cam surface. A plurality of plungers are enclosed in the plunger chambers by return springs and are reciprocated in the axial direction. A high pressure chamber is communicated with a plurality of plunger chambers through a delivery passage in which a delivery valve is arranged, and a low pressure chamber communicates each of the plunger chambers through suction passages having suction valves and a plurality of oil circulating grooves are formed in the axial direction on an outer peripheral surface of the rotor member. A throttle mechanism is arranged between the high pressure chamber and the low pressure chamber and throttles the oil passage.

On the other hand, there is also provided a variable orifice mechanism which moves when the delivery pressure from the plunger reaches a predetermined value and moves by being depressed by a temperature sensitive deforming member which is deformed when the oil temperature reaches a predetermined temperature.

Further, there are provided a shutoff valve for the rotor in order to drain the oil from the main passage, a shutoff valve for the cam housing in order to inject the oil, and a shutoff valve for the cam housing in order to drain the oil.

According to the invention, since the oil circulating grooves are provided for the rotor to thereby allow the oil to be circulated on the outer diameter side of the rotor, the cooling can be sufficiently executed and the durability of the plunger sealing portion or the like can be improved.

On the other hand, when the delivery pressure or the oil temperature reaches a predetermined value, the orifice is closed and locked by the movement of the orifice valve, so that an abnormal increase in oil temperature can be suppressed.

Further, even if a defective return of the plunger occurred, since the plunger is reciprocated in the axial direction, the generation of vibration can be prevented without essentially causing an imbalance of the weight.

Moreover, since the oil is injected and drained through the shutoff valves, the oil can also be sealed even after completion of the assembly, the air bleed can be sufficiently executed, and the assembling costs can be reduced.

In addition, according to the invention, the oil pressure detecting mechanism which is moved in accordance with the delivery pressure and the variable orifice mechanism whose orifice cross sectional area changes due to the movement of the oil pressure detecting mechanism are provided for the main passage to collect the oils which were delivered from a plurality of plungers, so that arbitrary transmission torque characteristics can be obtained.

That is, the transmission torque is proportional to the delivery pressure and the torque characteristics are determined by the orifice cross sectional area. Therefore, by properly designing the change characteristics of the orifice cross sectional area due to the movement of the oil pressure detecting mechanism for the delivery pressure, it is possible to realize the torque transmission characteristics such as to satisfy the required performance which differs depending on the use location of the joint and the characteristics of a vehicle.

The above objects, features, and advantages of the present invention will become more apparent from the following detailed description with reference to the accompanying drawings.

BRIEF DESCRIPTION OF THE DRAWINGS

FIG. 11A is an explanatory diagram of the torque for a rotational angle of the No. 1 plunger;

FIG. 11B is an explanatory diagram of the torques for rotational angles of all of the plungers;

FIG. 11C is an explanatory diagram of the total torque for a rotational angle;

FIG. 12 is an explanatory diagram of a working method of the cam surface in the invention;

FIG. 13 is a cam curve diagram which is used to work the cam surface;

FIGS. 14, 15, and 16 are explanatory diagrams of a plunger in the invention;

DETAILED DESCRIPTION OF THE PREFERRED EMBODIMENTS

Figure 1:
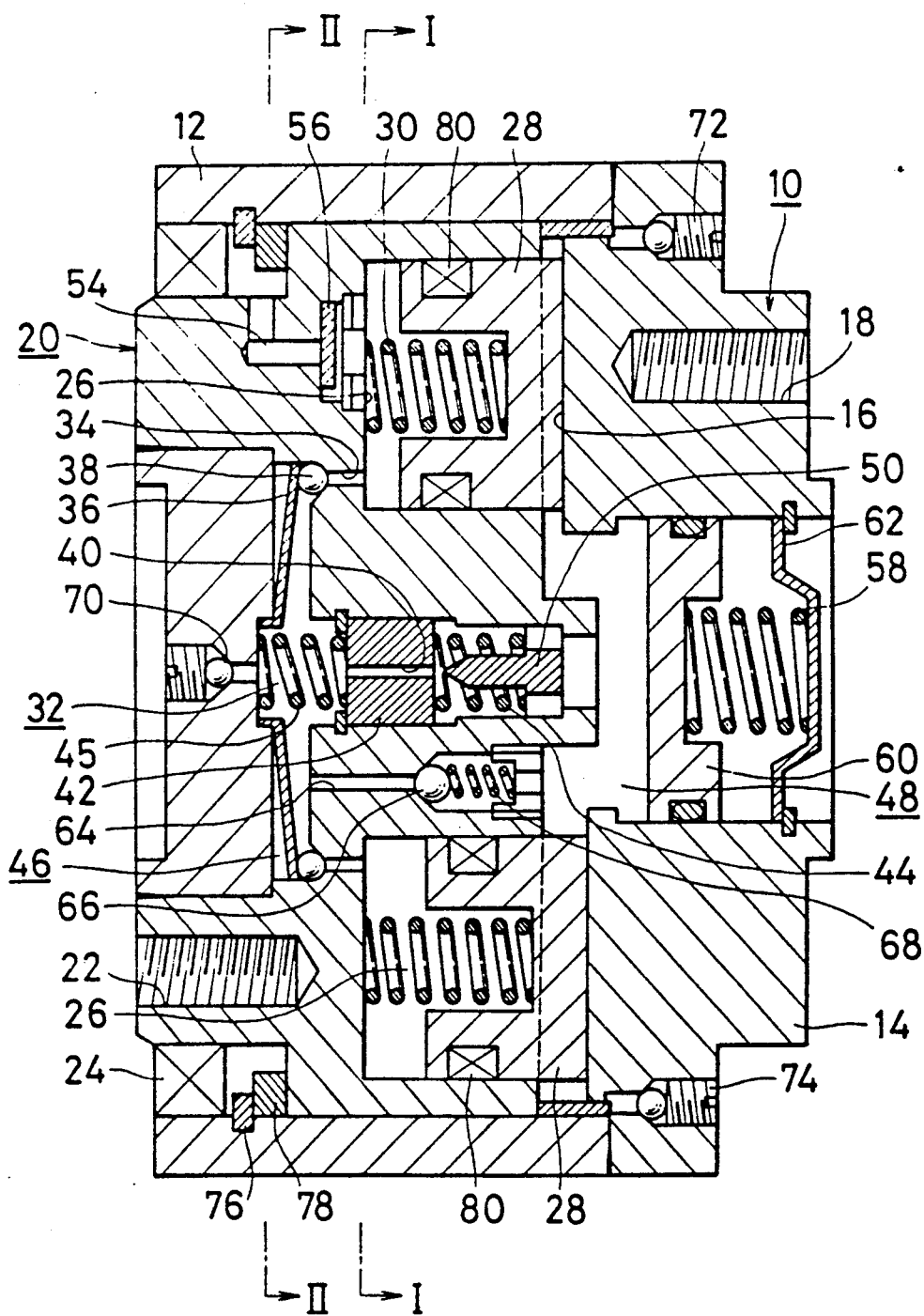
FIG. 1 is a cross sectional view in the axial direction showing an embodiment of the present invention.

In FIG. 1, reference numeral 10 denotes a cam housing comprising a cylinder portion 12 and an edge surface portion 14. A cam surface 16 is formed on the inside of the edge surface portion 14 of the cam housing 10. As will be described hereinafter, for instance, four cam mountains are formed on the cam surface 16. An attaching screw hole 18 to couple, for instance, an input shaft is formed on the outside of the edge surface portion 14 of the cam housing 10. Therefore, the cam housing 10 rotates integrally with the input shaft.

Reference numeral 20 denotes a rotor which is coupled with, for example, an output shaft by an attaching screw hole 22 formed on the left edge surface, that the rotor 20 rotates integrally with the output shaft. An oil seal 24 is interposed between the cam housing 10 and the rotor 20.

It is also possible to couple the output shaft to the cam housing 10 and to couple the input shaft to the rotor 20.

Figure 2:
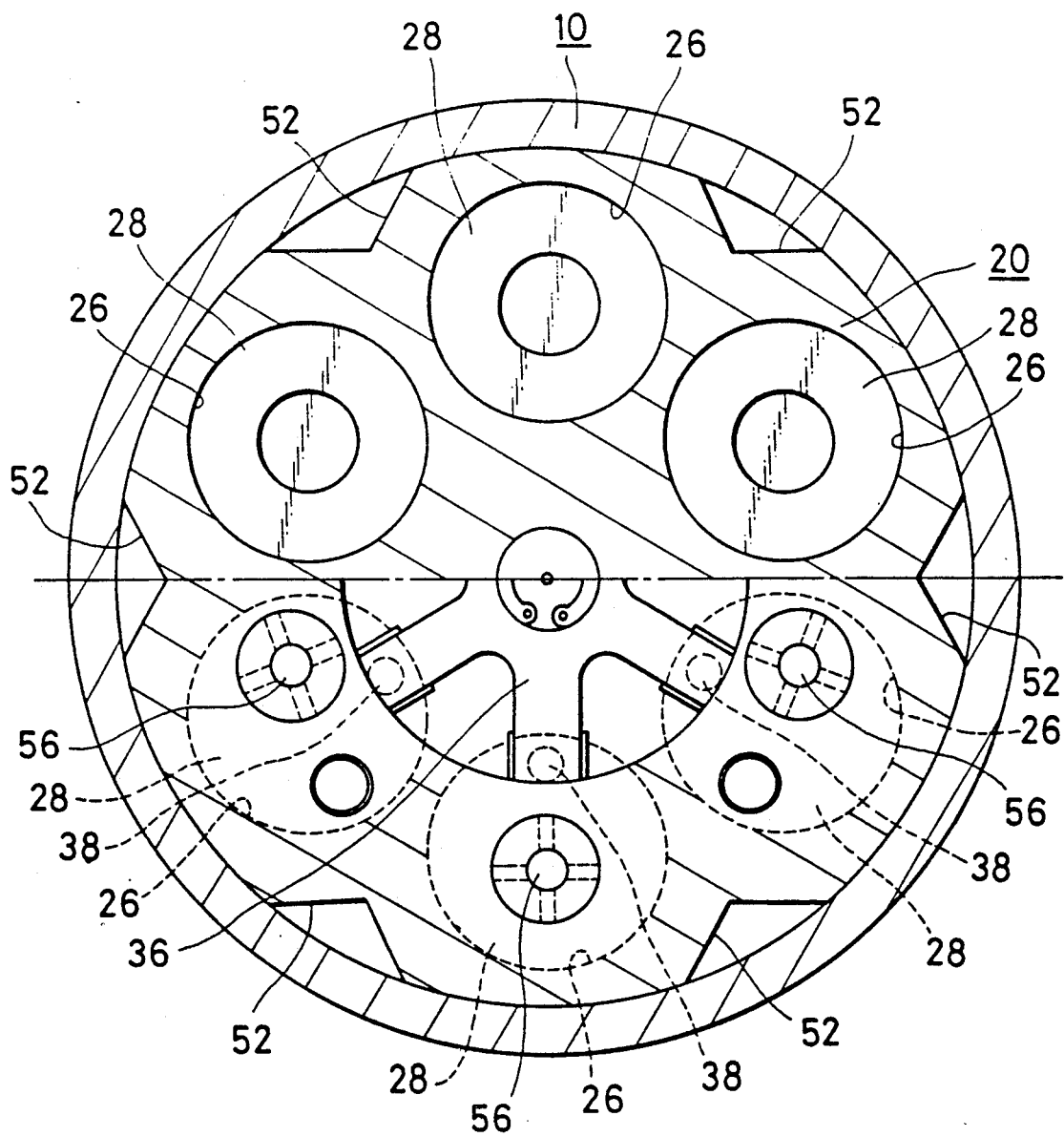
FIG. 2 is a cross sectional view whose upper half portion shows a cross sectional view taken along line I—I in FIG. 1 and whose lower half portion shows a cross sectional view taken along the line II—II in FIG. 1.

A plurality of plunger chambers 26 are formed in the axial direction in the rotor 20. In the embodiment, six plunger chambers 26 are formed as shown in FIG. 2. In each of the plunger chambers 26, a plunger 28 is slidably enclosed through a return spring 30.

A main passage 32 is formed in the central portion of the rotor 20. The main passage 32 and the six plunger chambers 26 are communicated through delivery passages 34, respectively. A delivery valve 38 is arranged on each of the six delivery passages 34 so as to be depressed by a return spring 36 having a radial spring arm, thereby allowing an oil to flow in only the direction of the main passage 32.

An orifice valve 42 having an orifice 40 is movably enclosed in the main passage 32. The orifice valve 42 is depressed from both sides by a spring 44 and a spring-like temperature sensitive deforming member 45. A high pressure chamber 46 is formed on the left side of the main passage 32 and a low pressure chamber 48 is formed on the right side by the existence of the orifice valve 42. Further, a needle valve 50 is fixedly arranged in the low pressure chamber 48 on the right side of the orifice valve 42 so as to face the orifice 40.

When the delivery pressure from the plunger chamber 26 has reached a predetermined value or the temperature has reached a predetermined value, the orifice valve 42 moves to the right, so that the orifice 40 is closed by the needle valve 50.

As shown in FIG. 2, six oil circulating grooves 52 are formed in the axial direction at the positions between the plungers 28 in the outer peripheral portion of the rotor 20. The oil circulating grooves 52 communicate the low pressure chamber 48 on the right side of the main passage 32 with suction passages 54 formed on the left side of the plunger chambers 26. Each of the suction passages 54 is communicated with each plunger chamber 26 through a suction valve 56. Therefore, the oil is circulated on the outer peripheral side of the rotor 20.

A piston 60 is slidably provided in the low pressure chamber 48 on the right side of the main passage 32 by being supported by a return spring 58. The return spring 58 is held by a holding member 62 so as not to be pulled out. A predetermined pre-load is generated in the low pressure chamber 48 by depressing the piston 60 with the spring 58.

A relief valve 66 for preventing an excessive torque is arranged on a passage 64 formed in parallel with the main passage 32 in a state in which the relief valve 66 is pressed by a spring 68.

Further, the rotor 20 is provided with a shutoff valve 70 to drain the oil from the high pressure chamber 46. The cam housing 10 is provided with a shutoff valve 72 to inject the oil and a shutoff valve 74 to drain the oil. Each of the shutoff valves 70, 72, and 74 is constructed by a plug and a ball.

Further, reference numeral 76 denotes a stop ring; 78 indicates a thrust washer; and 80 an oil seal of the plungers 28.

The operation of the embodiment of FIG. 1 will now be described.

When no rotational difference occurs between the cam housing 10 and the rotor 20, the plungers 28 do not stroke and no torque is transmitted. At this time, the plunger chambers 26 are coupled with the low pressure chamber 48 through the suction valves 56, suction passages 54, and oil circulating grooves 52 and are applied with a slight pre-load by the piston 60. However, since the pre-load also acts on the side of the high pressure chamber 46, the pressures on the right and left sides of the plunger 28 are the same and the plunger 28 does not stroke. Thus, the plunger 28 is pressed onto the cam surface 16 by the return spring 30.

When a rotational difference occurs between the cam housing 10 and the rotor 20, the plunger 28 strokes in accordance with the relative rotation between them. That is, in the delivery step, the plunger 28 relatively rides over the summit of the cam mountain of the cam surface 16 of the cam housing 10, so that the plunger 28 is depressed to the left.

Therefore, the plunger 28 extrudes the oil in the plunger chamber 26 from the delivery passage 34 into the high pressure chamber 46 through the delivery valve 38 and the suction valve 56 closes the suction passage 54. The oil extruded into the high pressure chamber 46 passes through the orifice 40 of the orifice valve 42 and is supplied to the low pressure chamber 48. At this time, the oil pressure in the plunger chamber 26 rises due to the resistance of the orifice 40 and a reaction force is generated in the plunger 28. A torque is generated by rotating the ca housing 10 against the reaction force of the plunger 28. The torque is transmitted between the cam housing 10 and the rotor 20.

When the cam housing 10 rotates further, the operating mode enters the suction step of moving the plunger 28 to the right. The oil in the low pressure chamber 48 is sucked into the plunger chamber 26 through the oil circulating groove 52, suction passage 54, and suction valve 56. The plunger 28 is returned along the cam surface 16 of the cam housing 10.

Figure 3:
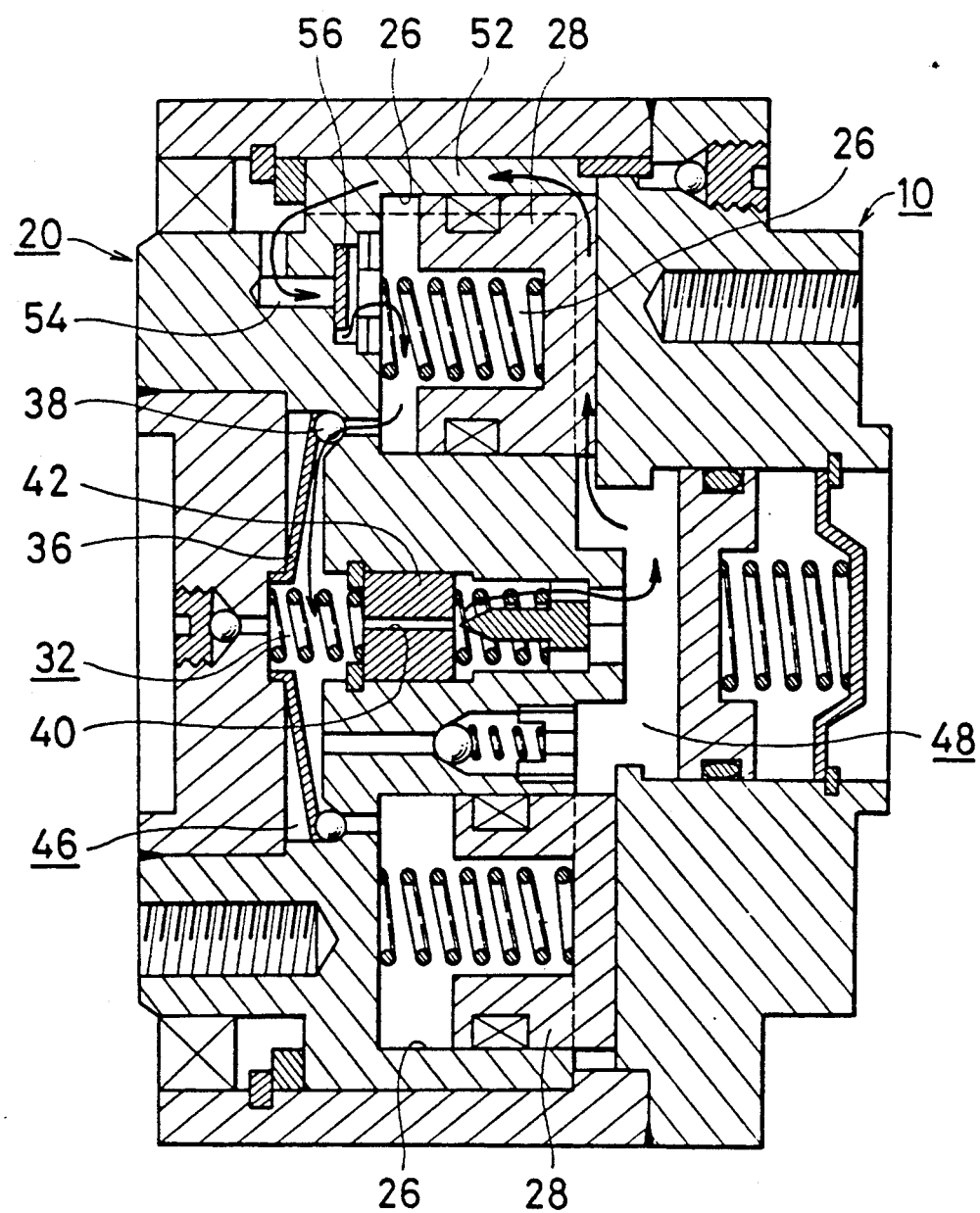
FIG. 3 is an explanatory diagram showing the flow of oil in a plunger stroke.

That is, the oil is circulated on the outer diameter side of the rotor 20 and is returned to the plunger chamber 26 as shown by arrows in FIG. 3.

The transmission torque generated as mentioned above is proportional to the oil pressure which is applied to the plunger 28. The oil pressure is proportional to the square of the flow velocity of the oil passing through the orifice 40. The flow velocity of the oil is proportional to the rotational speed difference between the cam housing 10 and the rotor 20. Therefore, torque transmission characteristics as shown by a curve 82 in FIG. 4 can be obtained. That is, a large torque T which is proportional to the square of a rotational speed difference $\Delta N$ can be obtained.

Figure 4:
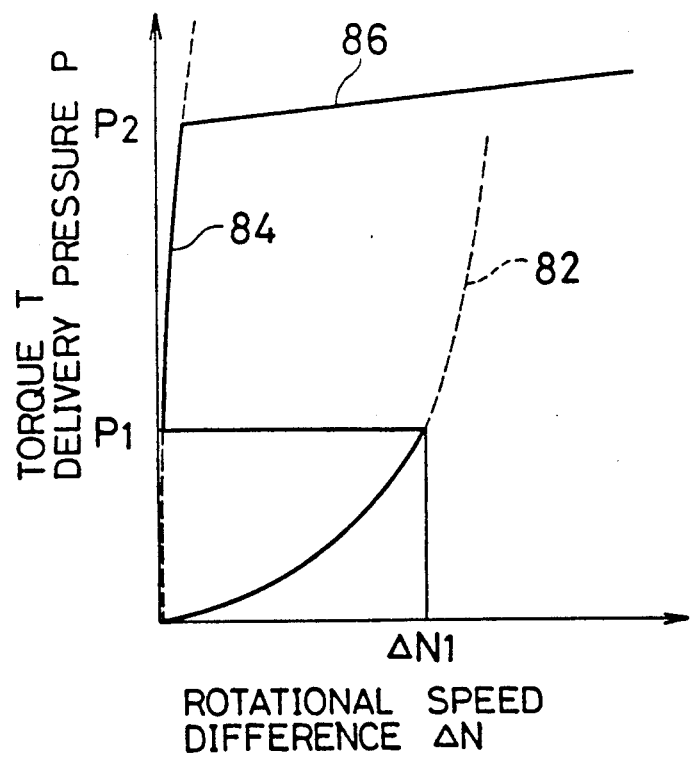
FIG. 4 is a graph showing characteristics of transmission torque and delivery pressure for a rotational speed difference obtained in the embodiment of FIG. 1.

On the other hand, when the rotational speed difference $\Delta N$ reaches a predetermined value $\Delta N_1$ and a delivery pressure P reaches a predetermined value $P_1$, the orifice valve 42 moves to the right and the orifice 40 is closed by the needle valve 50. Therefore, since the flow of the oil is shut off, the plunger 26 cannot stroke and is locked. Thus, characteristics as shown by a curve 84 in FIG. 4 are obtained. When the delivery pressure P is set to the predetermined value $P_1$ or less, the characteristics are returned to the ordinary torque characteristics 82.

On the other hand, when the oil temperature reaches a predetermined temperature, the spring-like temperature sensitive deforming member 45 is extended and the orifice valve 42 is forcedly moved. The orifice 40 is closed by the needle valve 50. Even in this case, the joint can be locked as shown by the curve 84 in FIG. 4.

Further, when the torque reaches a delivery pressure $P_2$ which gives the maximum torque, the torque is limited as shown by a characteristic curve 86 in FIG. 4 by the operation of the relief valve 66.

Figure 5:
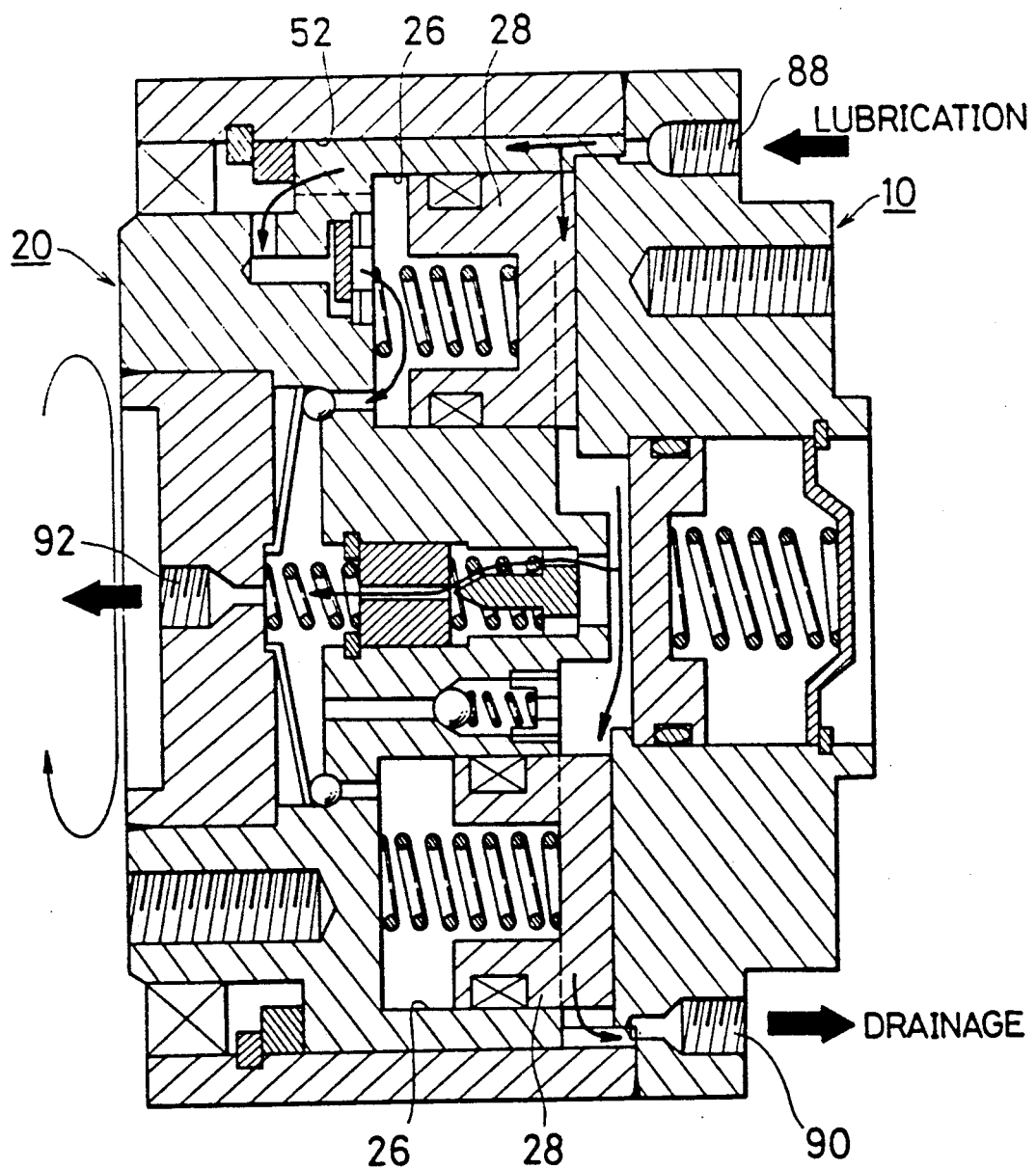
FIG. 5 is an explanatory diagram showing the lubrication and drainage of oil upon assembly.

FIG. 5 is an explanatory diagram of the lubricating state upon assembly in the embodiment of FIG. 1. The shutoff valves 72 and 74 provided for the cam housing 10 and the shutoff valve 70 provided for the rotor 20 are removed. The oil is injected from a port 88 and is drained from ports 90 and 92. In this state, by rotating the rotor 20 as shown by an arrow, the oil can be filled by the sufficient air bleed.

The shape of the cam surface of the cam housing 10 in FIG. 1 will be described. Upon relative rotation between the cam housing 10 and the rotor 20, a cam surface shape realizes the stroke of the plunger 28, which hardly has fluctuations in volume and torque, so that the joint in which vibrations and the like are suppressed can be realized.

Figure 6:
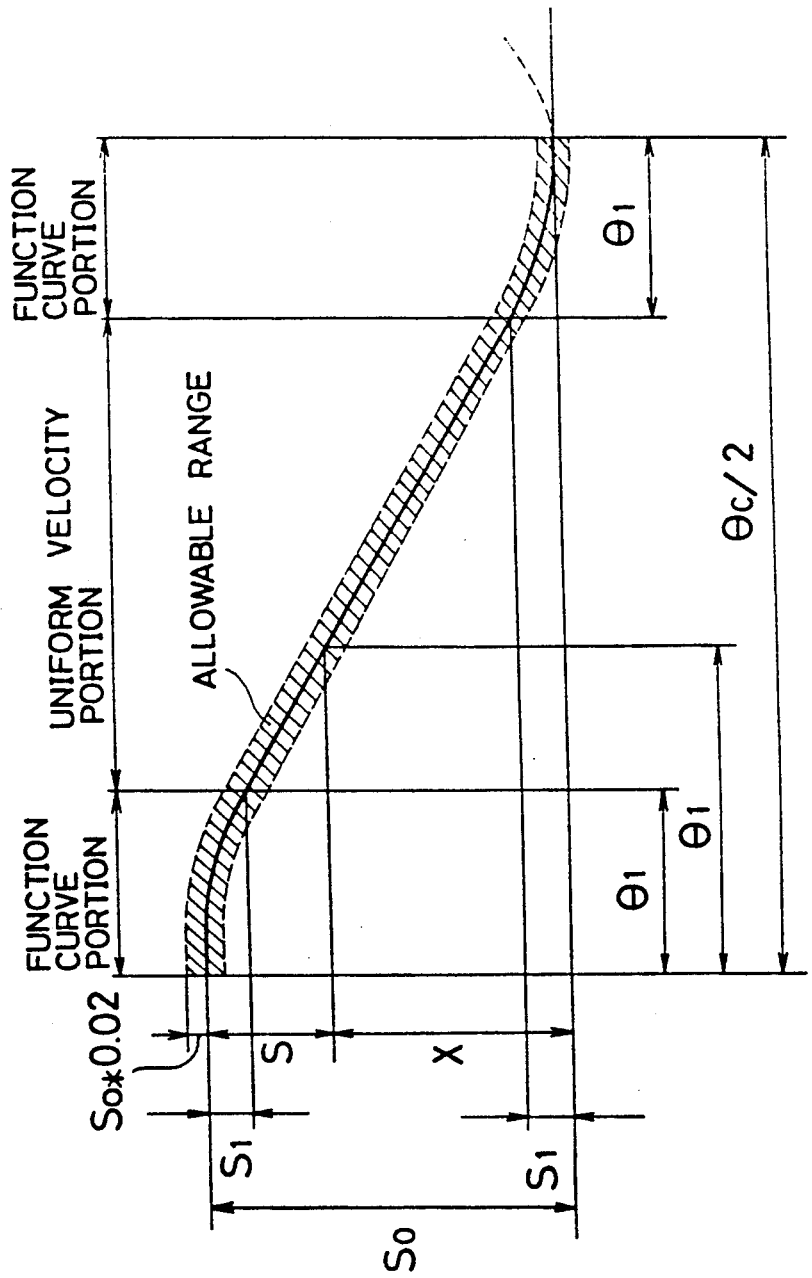
FIG. 6 is a cam curve diagram for forming the cam surface in the invention.

FIG. 6 shows the cam curve for a rotational angle $\theta$ with respect to half of the cam mountain. A stroke X of the plunger 28 is obtained from the cam curve.

In FIG. 6, according to the cam curve which is used in the invention, function curve portions are provided on both sides of the straight line equal velocity portion.

It is now assumed that a cam equal fraction is set to $k_c$ and $360/k_c$ is set to $\theta_c$.

The stroke X is obtained in a range of $0 \leq \theta \leq \theta_c/2$. With respect to a range of $\theta_c/2 < 2 < \theta \leq \theta_c$, the stroke X is symmetrical to that in the former half range by setting $\theta_c/2$ as a reference.

Figure 7:
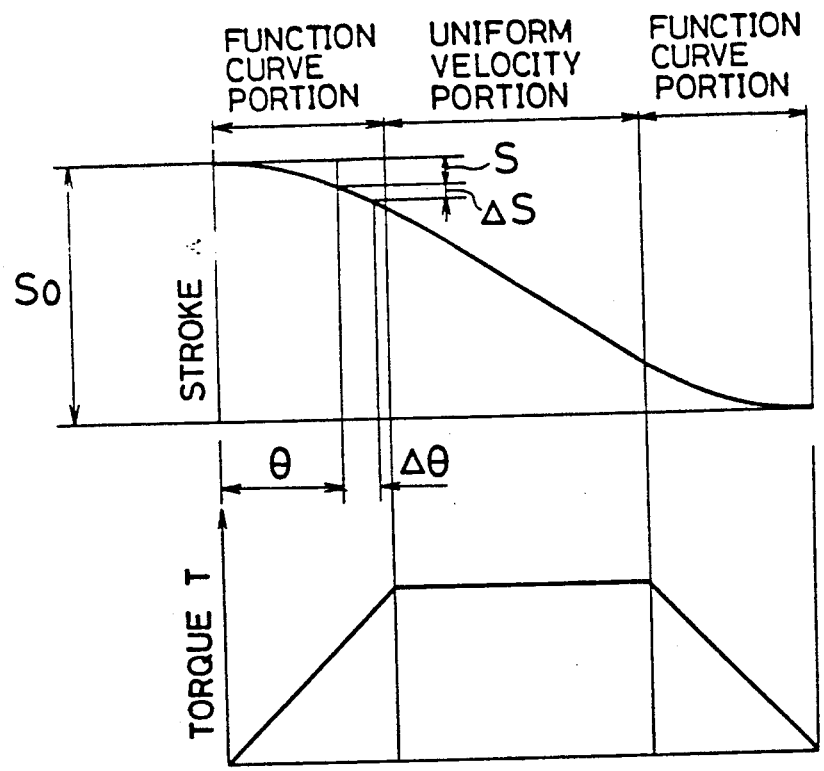
FIG. 7 is a diagram showing the relation between the cam curve and the generation torque.

Now, assuming that the torque T is proportional to the nth power of the inclination of the cam at the cam contact point of the plunger 28, that is, $$T \propto \left( \frac{\Delta S}{\Delta \theta} \right)^n$$

as shown in FIG. 7, in order to linearly raise the torque T for the period of time when the plunger 28 progresses in the function curve portion, it is necessary to use functions as shown by the following equations.

$$\left( \frac{\Delta S}{\Delta \theta} \right)^n = a^n \theta \tag{1}$$

$$\frac{\Delta S}{\Delta \theta} = a \theta^{1/n}$$

On the other hand, a stroke S is obtained by the following equation.

$$S = \frac{n}{(n+1)} a \theta^{((n+1)/n)} \tag{2}$$

Now, assuming that the cam inclinations of the connecting portions of the function curve portions and the equal velocity portion are the same, a coefficient is obtained by an equation (3) which is derived by developing the following equation.

$$\frac{S_0 - 2S_1}{\theta_c/2 - 2\theta_1} = a\theta_1^{1/n}$$

where, the left side indicates the cam inclination of the equal velocity curve portion and the right side denotes the cam inclination of the function curve portion.

Since $S_1 = \frac{n}{(n+1)} a \theta_1^{((n+1)/n)}$ $$S_0 - \frac{2n}{(n+1)} a\theta_1^{((n+1)/n)} = a\theta_1^{1/n}(\theta_c/2 - 2\theta_1) \tag{3}$$

$$S_0 = a\theta_1^{1/n} \left( \theta_c/2 - 2\theta_1 + \frac{2n}{n+1} \theta_1 \right) =$$

$$a\theta_1^{1/n} \left( \theta_c/2 + \frac{-2n - 2 + 2n}{n+1} \theta_1 \right) =$$

$$a\theta_1^{1/n} \left( \theta_c/2 - \frac{2}{n+1} \theta_1 \right)$$

-continued $$\therefore a = \frac{S}{\theta_1^{1/n} \left( \theta_c/2 - \frac{2}{n+1} \theta_1 \right)}$$

From the above calculating equations, the stroke X when the plunger 28 is arranged at the rotational angle $\theta$ is expressed by the equations (4) (5), and (6), respectively.

[When $0 \leq \theta \leq \theta_1$] (4)
$$X = S_0 - \frac{n}{(n+1)} a\theta^{((n+1)/n)}$$

[When $\theta_1 < \theta \leq \theta_c/2 - \theta_1$] (5)
$$X = S_0 - S_1 - \frac{S_0 - 2S_1}{(\theta_c/2 - 2\theta_1)} \times (\theta - \theta_1)$$

[When $\theta_c/2 - \theta_1 < \theta \leq \theta_c/2$] (6)
$$X = \frac{n}{(n+1)} a(\theta_c/2 - \theta)^{((n+1)/n)}$$

Figure 8:
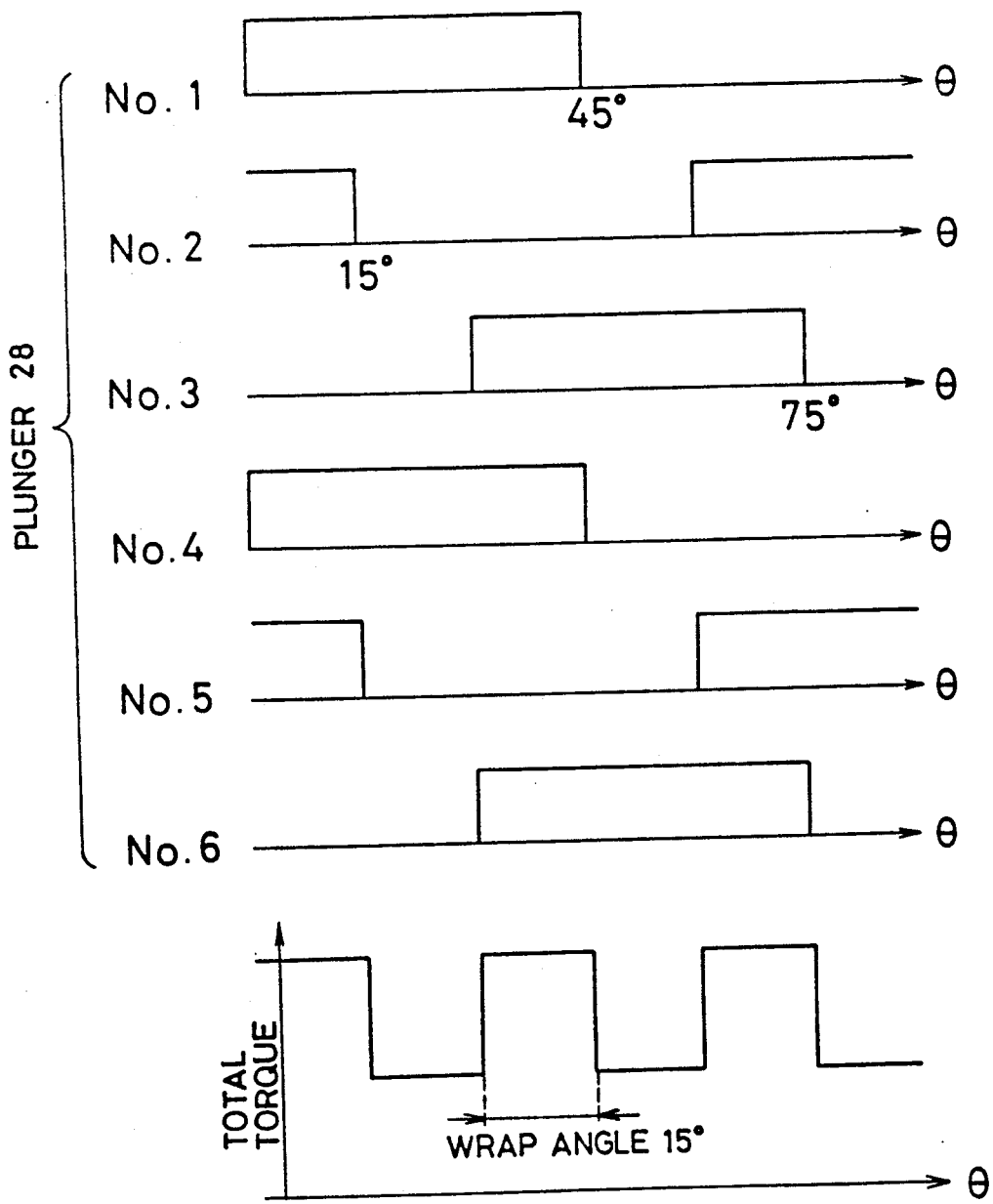
FIG. 8 is an explanatory diagram showing the operations of six plungers and the total torque thereof for the cam rotation.
Figure 9:
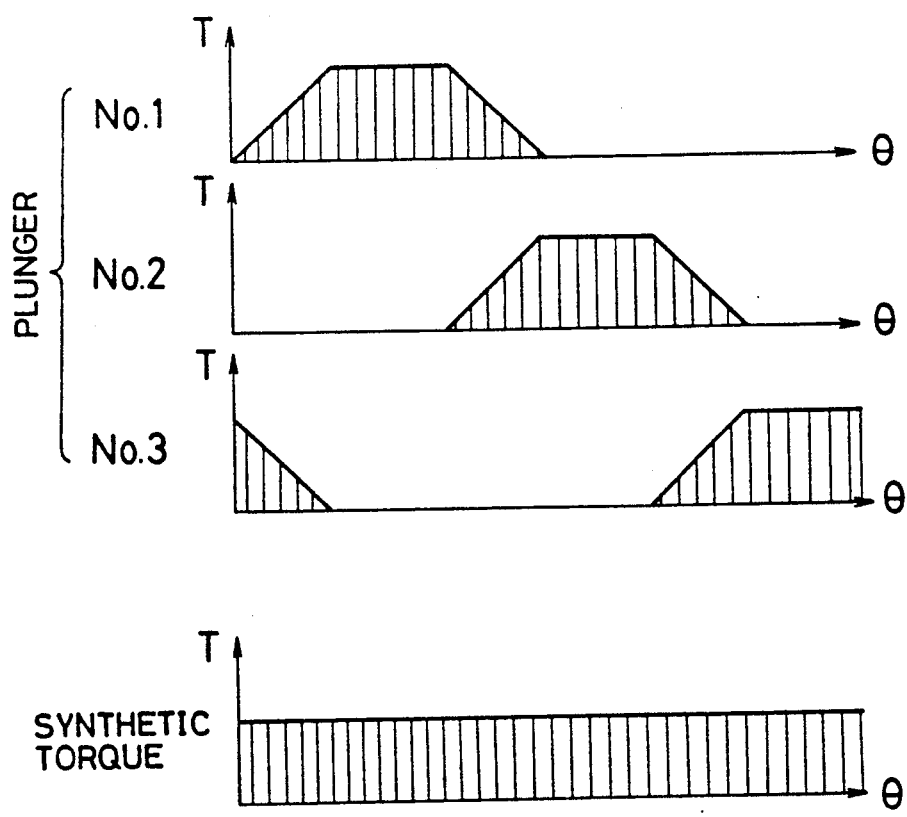
FIG. 9 is an explanatory diagram of the generation torques of three sets of plungers and the synthetic torque thereof.

As shown in FIG. 8, when the rotational angle $\theta_1$ is equalized to the wrap angle of 15° of the torque, the synthetic torque does not fluctuate as shown in FIG. 9. As the result of the experiments, $$n \approx 1$$

is proper as a value of n in the equations (4) to (6). On the other hand, for the above equations (4) to (6), a range of accuracy of the cam surface of $\pm S_{OX} - 0.02$ can be permitted, as shown by a range surrounded by broken lines in FIG. 6.

Figure 10A:
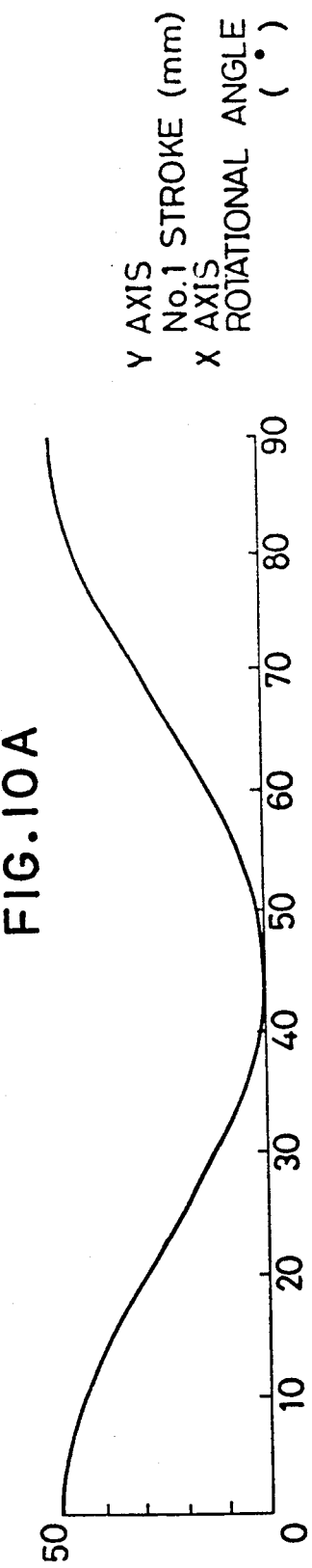
FIG. 10A is an explanatory diagram of the stroke for a rotational angle of the No. 1 plunger.
Figure 10B:
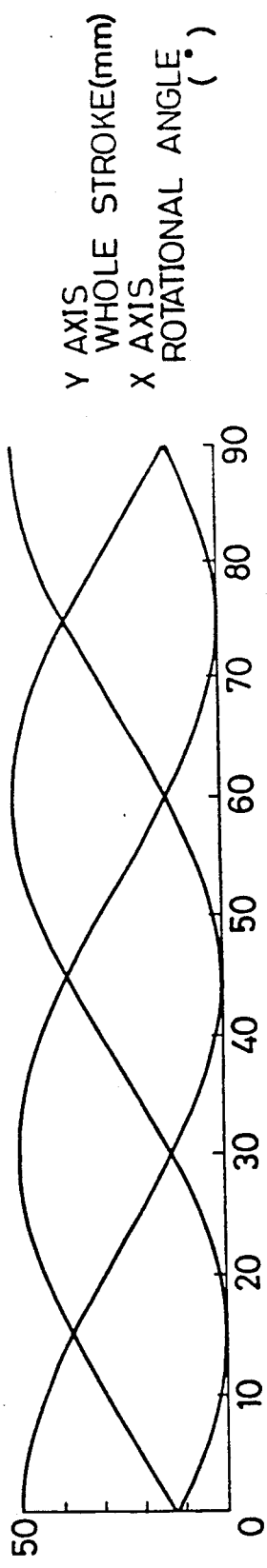
FIG. 10B is an explanatory diagram of the strokes for the rotational angles of all of the plungers.
Figure 10C:
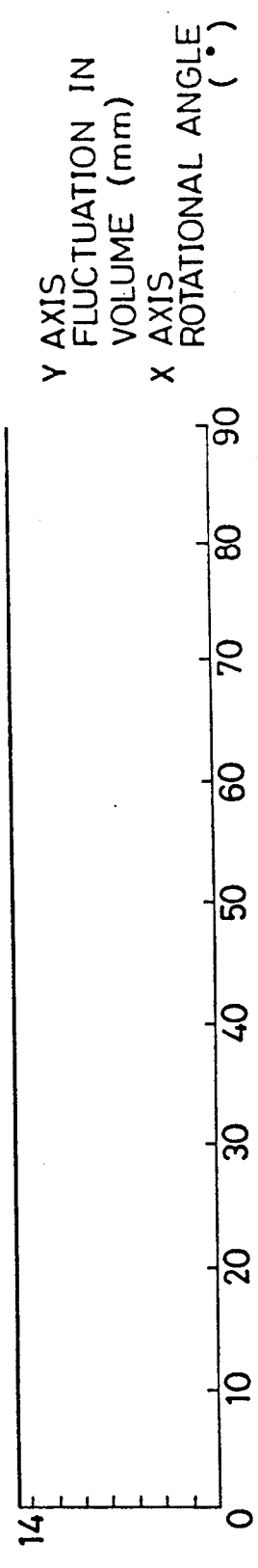
FIG. 10C is an explanatory diagram of a change in total volume for a rotational angle.

FIG. 10A shows a stroke diagram of the No. 1 plunger. FIG. 10B shows a stroke diagram of all of the plungers of Nos. 1 to 6. FIG. 10C shows a volume fluctuation (the total stroke of the plungers x the cross sectional area of the plunger). As will be obvious from FIG. 10C, the volume hardly fluctuates.

FIG. 11A shows the torque of the No. 1 plunger. FIG. 11B shows the torques of all of the plungers of Nos. 1 to 6. FIG. 11C shows the total torque. As will be obvious from FIG. 11C, the torque hardly fluctuates. Therefore, a joint which hardly has vibrations or the like can be realized.

FIG. 12 shows a method of working the cam surface along the cam curve of FIG. 6. A radius of an end mill 94 for working is the same as a radius of the cylindrical portion of the edge portion of the plunger.

The end mill 94 executes the vertical motion along the cam curve together with the rotation of the cam housing 10. As shown in FIG. 13, the end mill 94 is positioned so as to obtain a predetermined stroke X for the rotational angle $\theta$ and four cam mountains are formed.

As shown in FIGS. 14, 15, and 16, an edge portion 96 of the plunger 28 has a cylindrical shape of the same radius as that of the end mill 94. Therefore, the plunger 28 executes the stroke motion similar to the end mill 94 in association with the rotation of the cam surface 16.

Figure 17A:
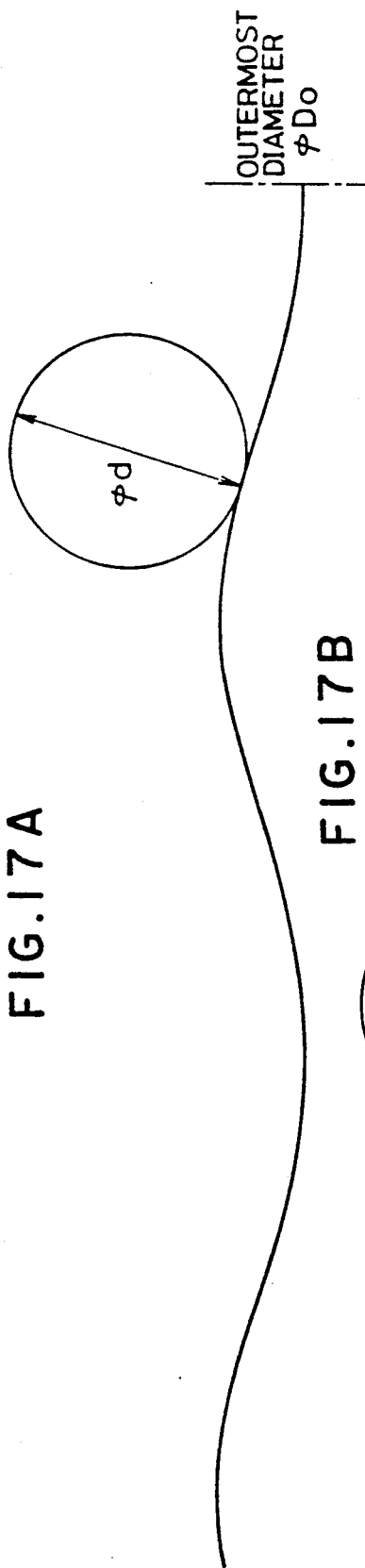
FIGS. 17A, 17B, and 17C are explanatory diagrams showing straight line developed states of cam curves corresponding to the outermost diameter of the cam surface, on a pitch circle, and of the innermost diameter, respectively.
Figure 17B:
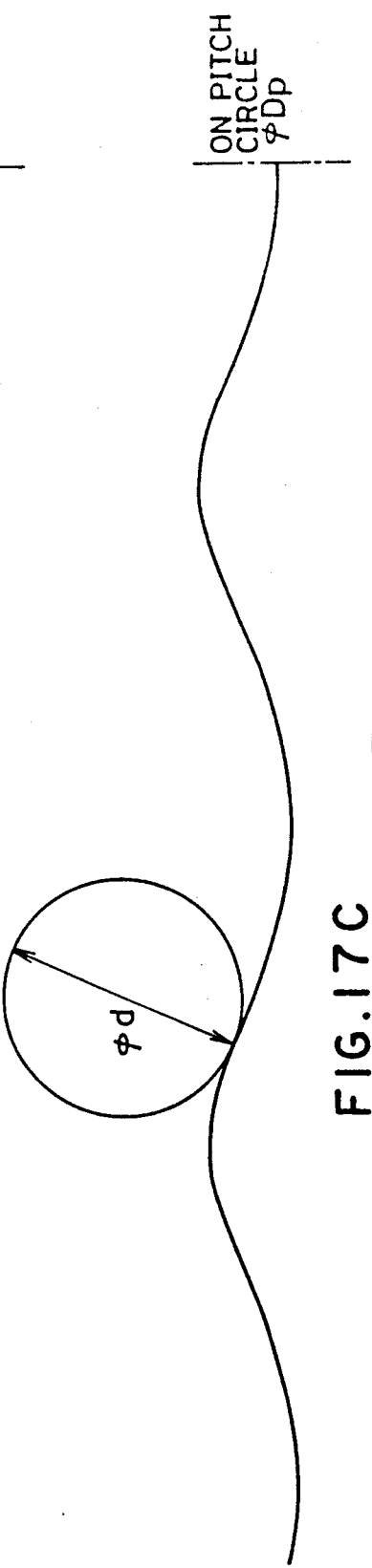
Figure 17C:
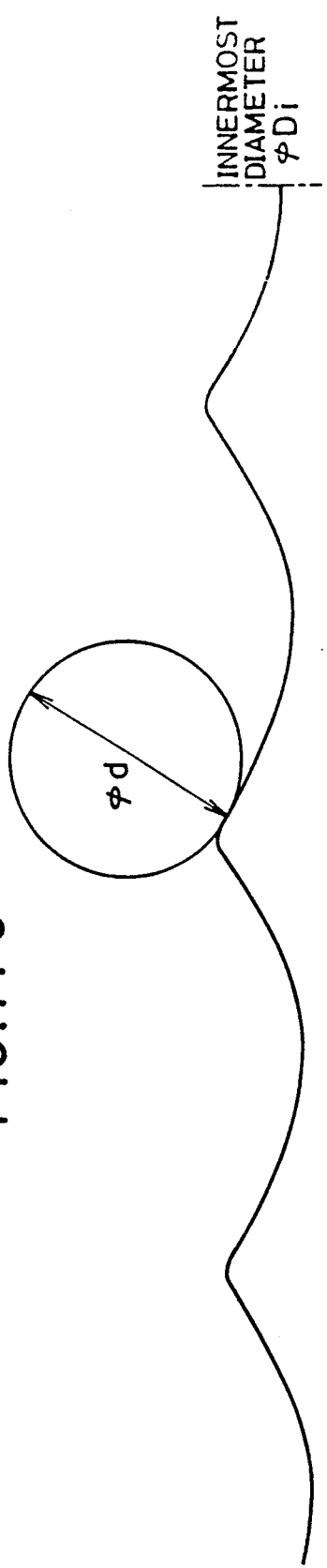

FIGS. 17A, 17B, and 17C are diagrams which are obtained by developing the cross sectional shapes as plan views in the case where the cam surface 16 which was worked by the method of FIG. 12 and the edge portion 96 of the plunger were cut away along the sliding direction.

Figure 18:
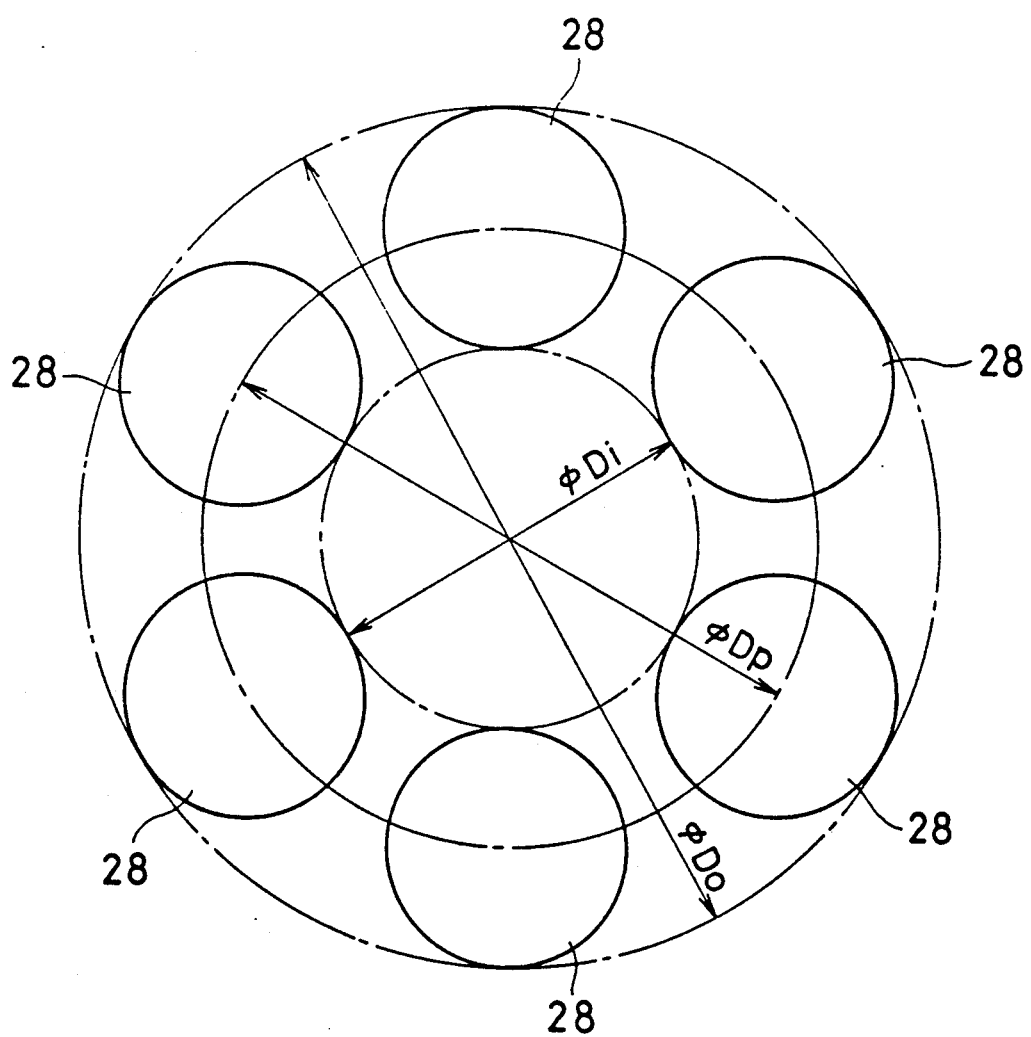
FIG. 18 is an explanatory diagram showing the positional relations of the cam curves of FIGS. 17A, 17B, and 17C for the plunger.

As shown in FIG. 18, $D_O$, $\phi D_p$, and $\phi D_i$ denote an outermost diameter of the plunger 28, a plunger center pitch diameter, and an innermost diameter in each arrangement state. Each portion of the plunger 28 slides along those pitch circles.

As shown in FIGS. 14, 15, and 16, the shape of the edge portion 96 of the plunger 28 is formed so as to come into line contact with the cam surface in the direction perpendicular to the sliding direction of the cam surface 16. Thus, a projection amount of the plunger 28 can be reduced.

On the other hand, since the plunger 28 and the cam surface 16 always come into contact with each other for the whole width of the plunger 28 and a long enough contact length can be assured, the contact stress can be reduced.

Thus, a small and light-weighted hydraulic power transmission joint having excellent durability can be obtained.

Figure 19:
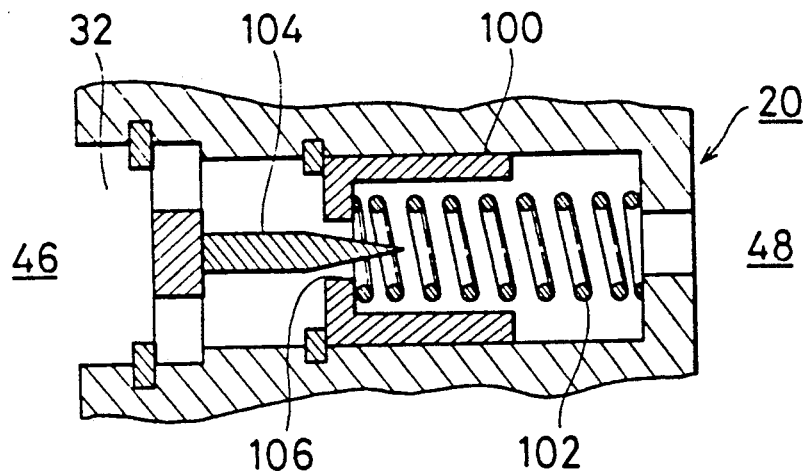
FIG. 19 is an explanatory diagram showing the first embodiment of a variable orifice in the invention.

Further, since the operating force from the cam surface 16 acts such that the plunger 28 always comes into close contact with the cam surface 16, the plunger 28 is always directed in the sliding direction and the plunger itself does not rotate FIG. 19 is an explanatory diagram showing an embodiment of a delivery pressure detecting mechanism and a variable orifice mechanism which are provided in place of the orifice valve 42, spring 44, and needle valve 50 provided for the main passage 32 in FIG. 1. A construction other than FIG. 19 is substantially the same as that in FIG. 1.

In FIG. 19, an orifice valve 100 serving as an oil pressure detecting mechanism is movably enclosed in the main passage 32 through a pressure setting spring 102. An edge of a needle valve 104, which is fixedly arranged, is inserted into an orifice passage 106 of the orifice valve 100. In this manner, the variable orifice mechanism is constructed.

The high pressure chamber 46 is formed on the left side of the main passage 32 and the low pressure chamber 48 is formed on the right side of the main passage 32 by the variable orifice mechanism.

When the delivery pressure P in the high pressure chamber 46 acts on the orifice valve 100, the force which is obtained by multiplying a pressure receiving area S of the orifice valve 100 with the delivery pressure P $$F = P \times S$$

acts in the right direction of the orifice valve 100.

Figure 20:
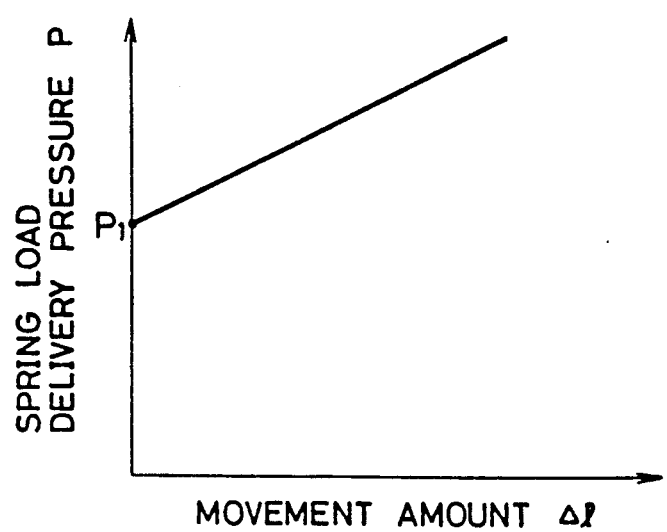
FIG. 20 is a characteristic graph showing changes in spring load and set pressure to a movement amount of a orifice valve.

When the operational force F exceeds a set load $F_1$ of the pressure setting spring 102, the orifice valve 100 moves to the right until the position at which the spring load $F_1$ and the operational force F are balanced. That is, changes in spring load and set pressure P for a movement amount $\Delta l$ of the orifice valve 100 are as shown in FIG. 20.

Since the edge of the needle valve 104 has a tapered shape, the cross sectional area of the orifice increases as the orifice valve 100 moves.

The operation of the embodiment of FIG. 19 will now be described.

Figure 21:
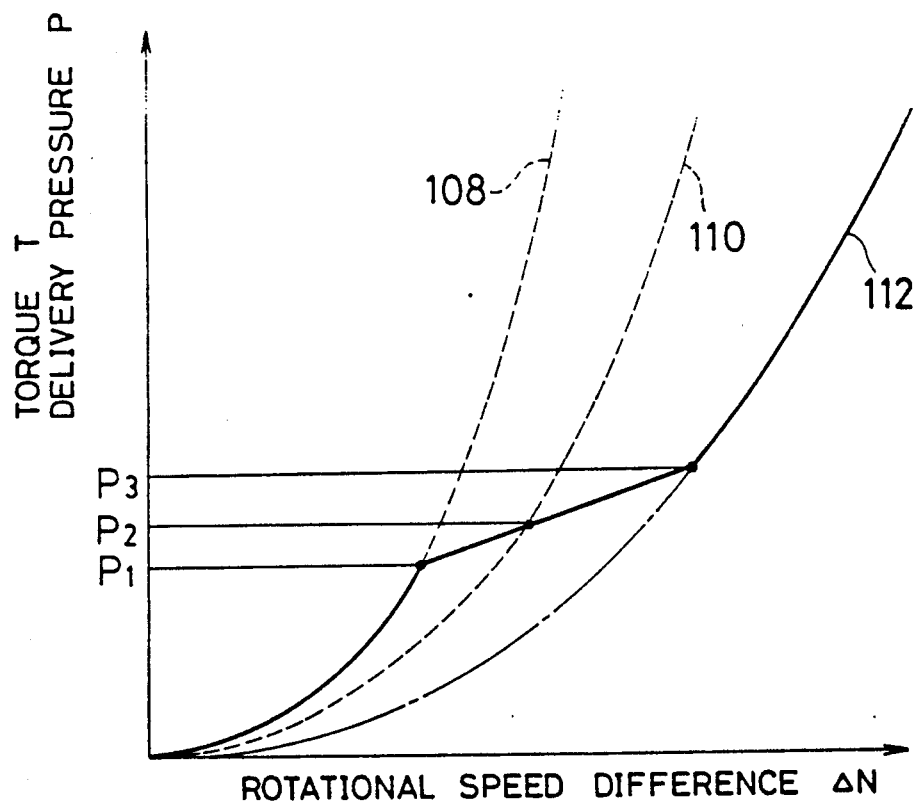
FIG. 21 is a characteristic graph of a transmission torque in the embodiment of FIG. 19.

First, when the delivery pressure P is the predetermined value $P_1$ or less, the force F which acts on the orifice valve 100 is smaller than the set load of the pressure setting spring 102, so that the orifice valve 100 does not move. The orifice cross sectional area due to the needle valve 104 at this time is small and the torque characteristics are as shown by a curve 108 in FIG. 21.

Figure 23:
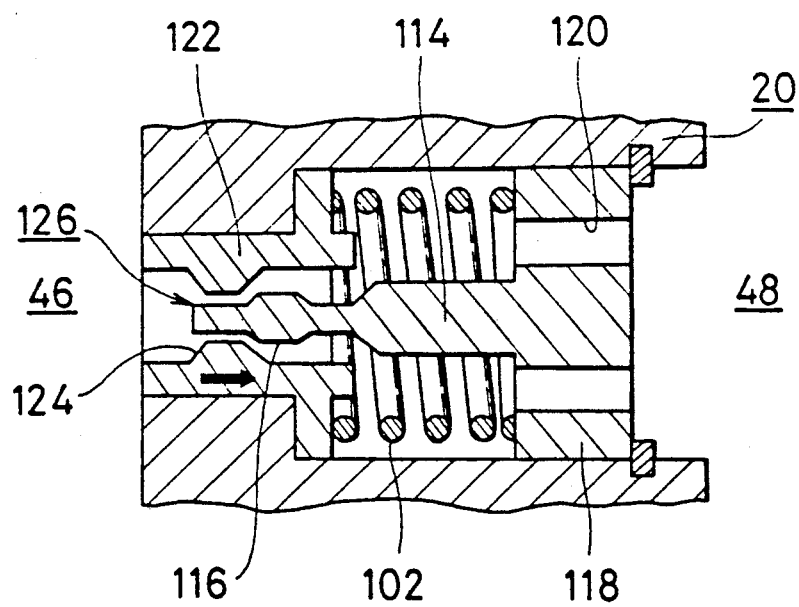
FIGS. 23 and 24 are explanatory diagrams showing a second embodiment of a variable orifice in the invention.

When the delivery pressure P reaches a predetermined delivery pressure $P_2$, the orifice valve 100 moves to the right by only $\Delta l$ as shown in FIG. 23. In this case, the orifice cross sectional area S due to the needle valve 104 has a size of about a middle value and the torque characteristics are as shown by a curve 110 in FIG. 21.

Next, when the delivery pressure P exceeds a predetermined delivery pressure $P_3$, the orifice valve 100 further moves to the right and the orifice cross sectional area due to the needle valve 104 increases. In this case, the torque characteristics are as shown by a curve 112 in FIG. 21.

In the torque area where the sudden torque change largely influences the motion of a vehicle, since the transmission torque T can be set so as to gently change for the rotational speed difference $\Delta N$, the stability of the vehicle can be improved.

Figure 24:
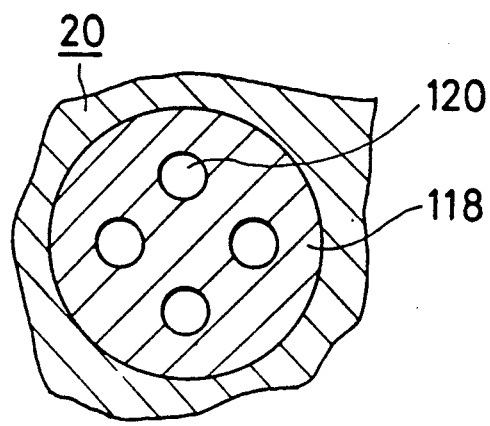

FIGS. 23 and 24 show a second embodiment of a variable orifice according to the invention.

Figure 25:
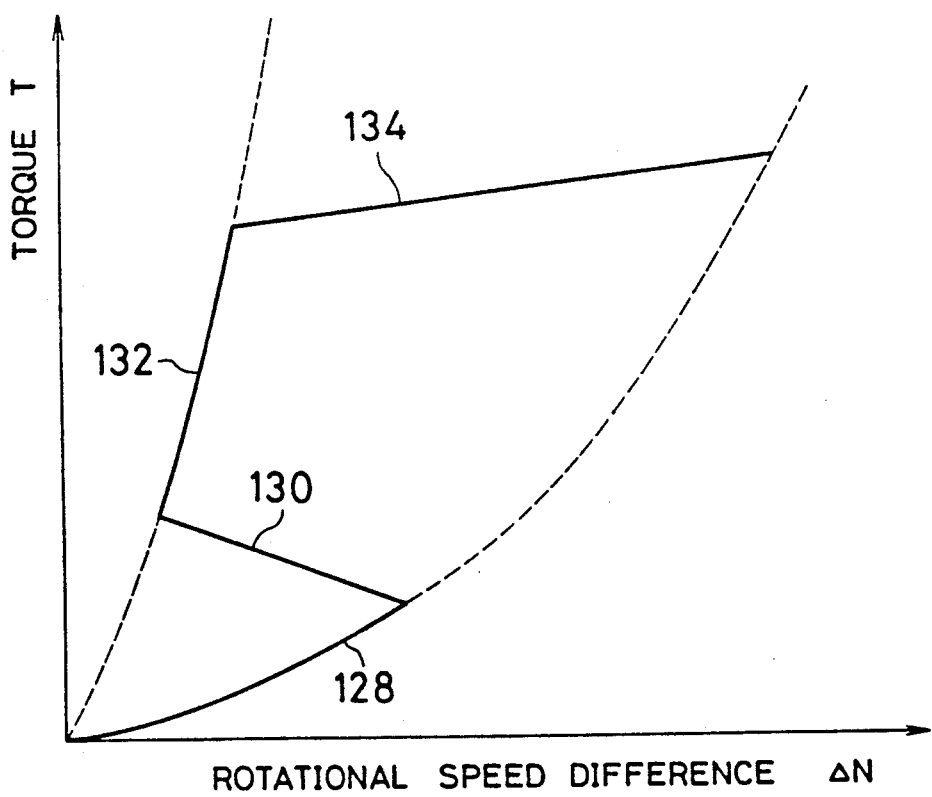
FIG. 25 is a characteristic graph of a transmission torque in the second embodiment.

In FIGS. 23 and 24, reference numeral 114 denotes a needle valve constructing a variable orifice mechanism. A step portion 116 having different diameters is formed on the edge portion of the needle valve 114. A plurality of communicating holes 120 are formed in a stopper portion 118 of the needle valve 114. A step portion 124 is also formed in an orifice valve 122 into which the needle valve 114 is inserted. A variable orifice 126 is formed between the orifice valve 122 and the needle valve 114. Reference numeral 102 denotes the pressure setting spring. Therefore, as shown in FIG. 25, there are obtained characteristics which are indicated by curves 128, 130, and 132 in accordance with the rotational speed difference $\Delta N$ and characteristics which are shown by a curve 134 as a substitute of a relief mechanism upon generation of the excessive torque.

Figure 26:
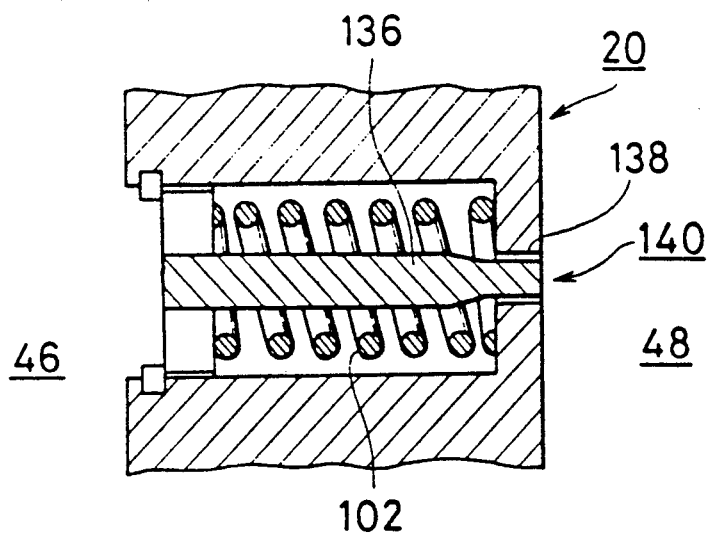
FIG. 26 is an explanatory diagram of a third embodiment of a variable orifice in the invention.

FIG. 26 shows a third embodiment of the invention. A needle valve 136 having the function of an oil pressure detecting mechanism is supported by the pressure setting spring 102 and a variable orifice 140 is formed between the needle valve 136 and communicating holes 138 of the rotor 20.

When the delivery pressure P of the high pressure chamber 46 acts on the needle valve 136, the needle valve 136 moves to the right. The orifice cross sectional area decreases with the movement of the needle valve 136. When the delivery pressure P exceeds a predetermined value, the variable orifice 140 is closed and locked.

In the embodiment, since the needle valve 136 also has the function of the oil pressure detecting mechanism, the whole apparatus can be miniaturized.

Figure 27:
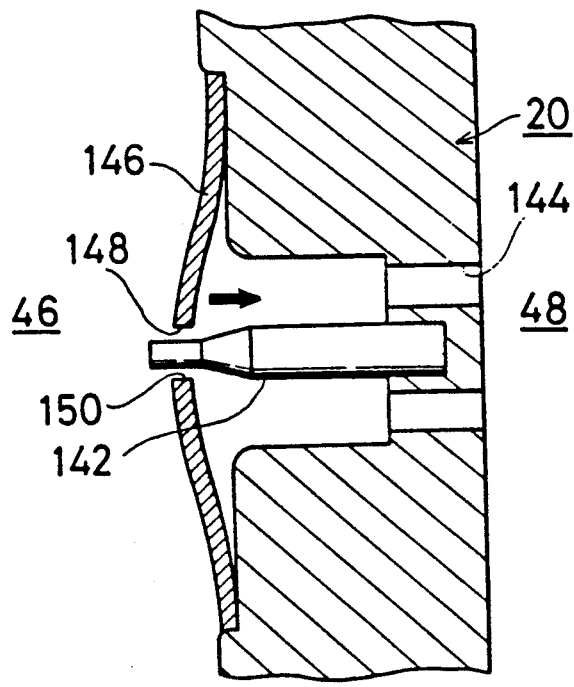
FIGS. 27 and 28 are explanatory diagrams of a fourth embodiment of a variable orifice in the invention.
Figure 28:
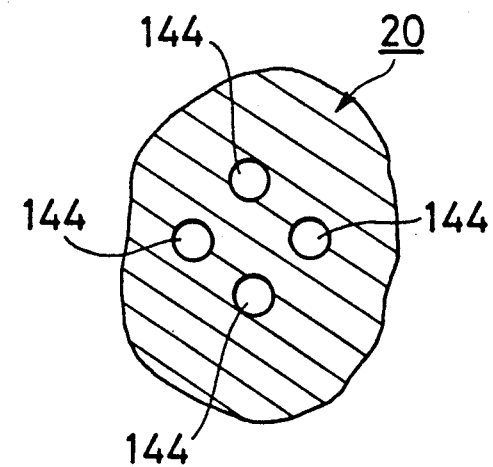

FIGS. 27 and 28 show a fourth embodiment of the invention. A needle valve 142 is inserted and fixed into the rotor 20. Reference numeral 144 denotes a communicating hole formed in the rotor 20. As shown in FIG. 28, the communicating holes 144 are formed at four positions. Reference numeral 146 denotes a diaphragm having the function as an oil pressure detecting mechanism. A variable orifice 150 is formed between a hole 148 formed in the diaphragm 146 and the needle valve 142.

When the delivery pressure P in the high pressure chamber 46 acts on the diaphragm 146, the diaphragm 146 is deformed and the orifice cross sectional area changes. When the delivery pressure P exceeds a predetermined value, the variable orifice 150 is closed and locked.

Figure 22:
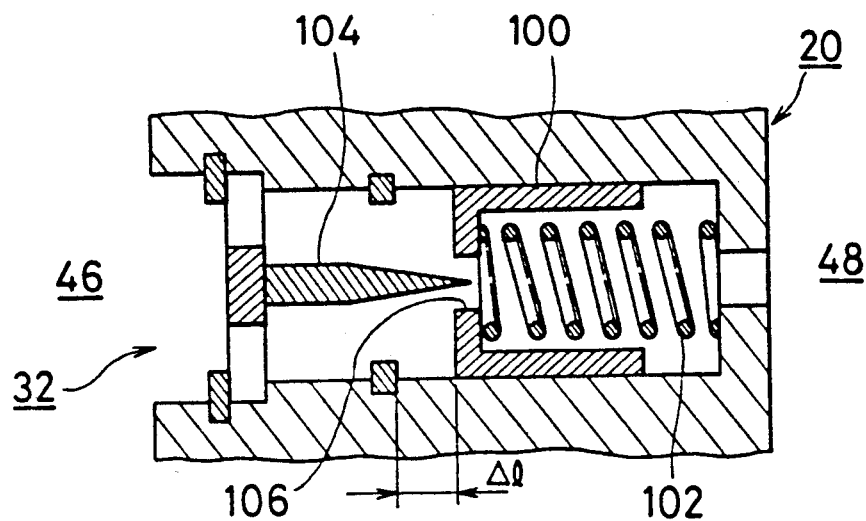
FIG. 22 is an explanatory diagram of a stroke state of the orifice valve.

In the embodiment of FIGS. 19 and 22, when foreign matter is choked in the gap in the sliding portion between the orifice valve and the rotor 20, the motion of the orifice valve deteriorates, so that the torque characteristics are not stabilized. However, in the embodiment of FIG. 27, such an inconvenience can be eliminated.

Figure 29:
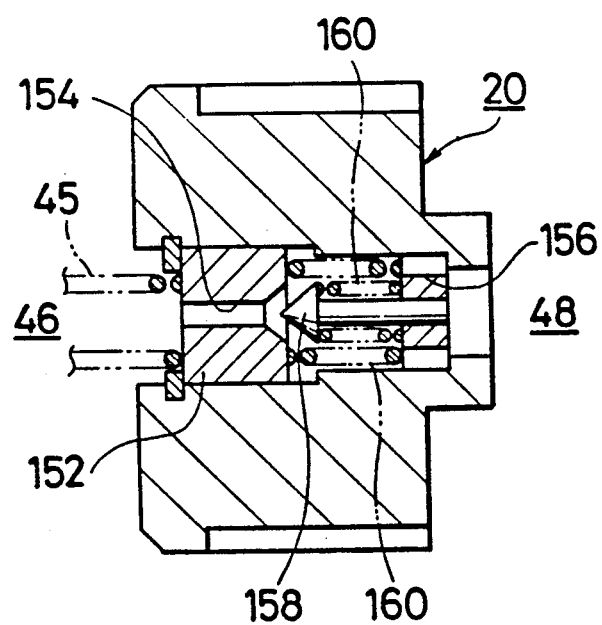
FIG. 29 is an explanatory diagram of an embodiment of an orifice valve having the relief function in the invention.

FIG. 29 shows an embodiment of an orifice valve mechanism having a relief function which is provided in place of the orifice valve 42, needle valve 50, and relief valve 66 provided for the main passage 32 of the rotor 20 in FIG. 1.

In FIG. 29, a ring member 156 is arranged on the right side of an orifice valve 152 having an orifice 154. A needle valve 158 is slidably arranged in the ring member 156. A spring 160 is provided between the orifice valve 152 and the ring member 156. On the other hand, a spring 162 is also provided between the back portion of the edge tapered portion of the needle valve 158 and the ring member 156.

The operation of FIG. 29 will now be described. When the delivery pressure in the high pressure chamber 46 rises, the orifice valve 152 moves to the right while compressing the spring 160. The opening portion of the orifice 154 abuts on the edge of the needle valve 158. The orifice 154 is closed and the cam housing 10 and the rotor 20 are locked.

When the delivery pressure further increases in the locked state, the orifice valve 152 abuts on the step portion and cannot move to the right. Therefore, the needle valve 158 compresses the spring 162 and is away from the opening portion of the orifice 154 and the relief operation to open the orifice 154 is again executed. Thus, the locked state is released.

What is claimed is:

1. A hydraulic power transmission joint in which two power transmission shafts are coupled so as to be relatively rotatable for, when a rotational speed difference occurs between said two shafts, transmitting a torque corresponding to the rotational speed difference, comprising:
 a cam housing coupled with one of said two shafts, said cam housing having a cam surface having a plurality of cam mountains defined on an inside edge surface thereof;
 a rotor member, coupled with the other of said two shafts, rotatably disposed in said cam housing, said rotor member having a plurality of axially extending plunger chambers and an outer peripheral surface;
 a plurality of plungers freely reciprocably disposed in respective said plunger chambers, each said plunger having a return spring applying a return pressure thereagainst;
 a high pressure chamber having a plurality of delivery passages with delivery valves therein communicating said high pressure chamber with said plurality of plunger chambers;
 a low pressure chamber, a plurality of oil circulating grooves extending axially on said outer peripheral surfaces of said rotor member communicating with said low pressure chamber, and a plurality of suction passages having suction valves communicating with said oil circulating grooves and said plurality of plunger chambers such that said low pressure chamber communicates with said plurality of plunger chambers; and
 a throttle mechanism arranged between said high pressure chamber and said low pressure chamber for throttling the passage of oil between said high pressure chamber and said low pressure chamber.

2. A joint according to claim 1, wherein said throttle mechanism comprises:
 an orifice valve means having a valve member with an orifice passage, moving said valve member in response to oil pressure in said high pressure chamber reaching a predetermined pressure, said orifice valve means further having a temperature sensitive deforming member moving said valve member in response to the oil temperature reaching a predetermined temperature; and
 a needle valve for closing said orifice passage upon movement of said valve member, wherein when the pressure in said high pressure chamber reaches said predetermined pressure, or the oil temperature reaches said predetermined temperature, said orifice passage is closed, thereby inhibiting relative rotation between said cam housing and said rotor member.

3. A joint according to claim 2, and further comprising a relief valve between said high pressure chamber and said low pressure chamber for limiting the increase in pressure in said high pressure chamber to a maximum allowable pressure.

4. A joint according to claim 1, wherein:
 said rotor member has a shutoff valve removably provided at a central portion thereof communicating with said high pressure chamber for draining said high pressure chamber; and
 said cam housing has a plurality of shutoff valves removably provided for injecting and draining oil.

5. A joint according to claim 1, wherein each said cam mountain of said cam surface of said cam housing has a summit portion, a valley portion, both said summit portion and said valley portion comprising a function curve portion for accelerating or decelerating movement of a said plunger, and an equal velocity portion between said summit and said valley portion.

6. A joint according to claim 1, wherein said low pressure chamber has a piston and a spring biasing said piston for generating a predetermined pre-load on the oil in said low pressure chamber and for absorbing changes in the volume of oil in said low pressure chamber.

7. A joint according to claim 1, wherein said throttle mechanism comprises:
 an oil pressure detecting means for detecting the oil pressure in said high pressure chamber, said oil pressure detecting means being movable in response to the oil pressure detected; and
 a variable orifice means having a variable orifice whose cross sectional area changes in accordance with movement of said oil pressure detecting means.

8. A joint according to claim 7, wherein said variable orifice means closed said variable orifice in accordance with movement of said oil detecting means in response to the oil pressure in said high pressure chamber reaching a predetermined value.

* * * * *